June 30, 1925.
E. RODOLAUSSE
1,544,483
SPEED CONTROLLING DEVICE FOR RAILWAY, TRAMWAY, AND SIMILAR TRAINS
Filed May 23, 1922
3 Sheets-Sheet 3
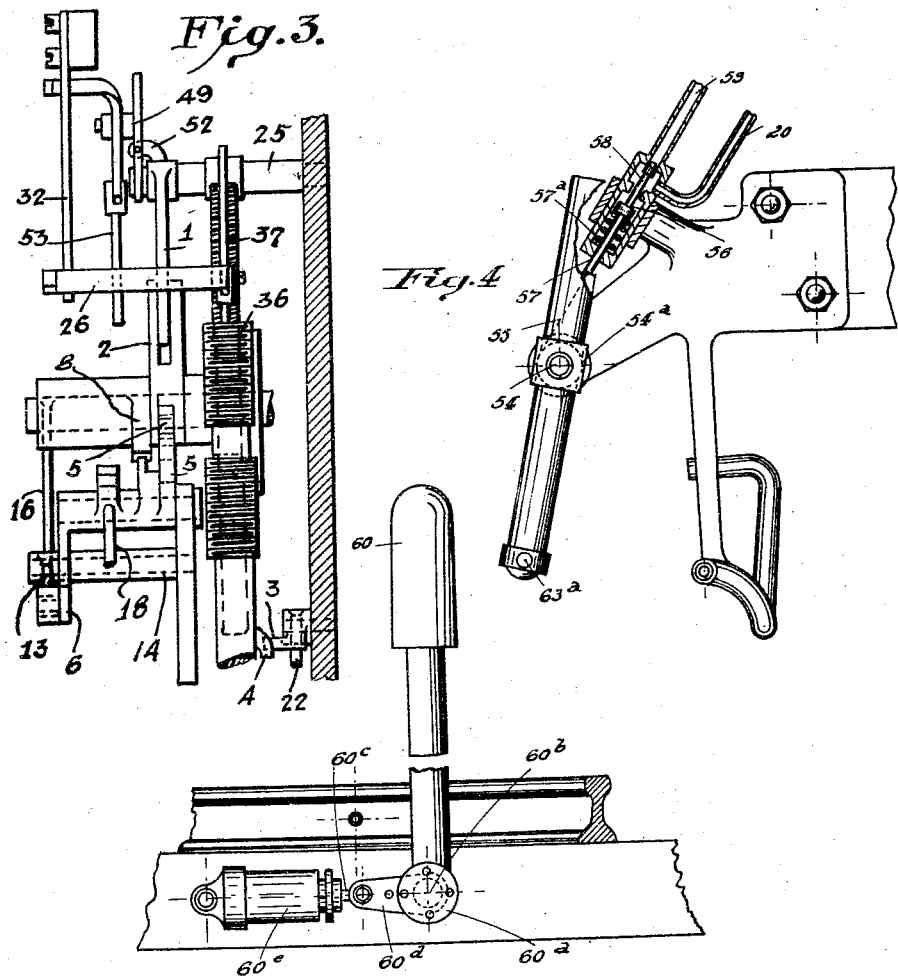
INVENTOR:
ELOI RODOLAUSSE
ATTORNEY.

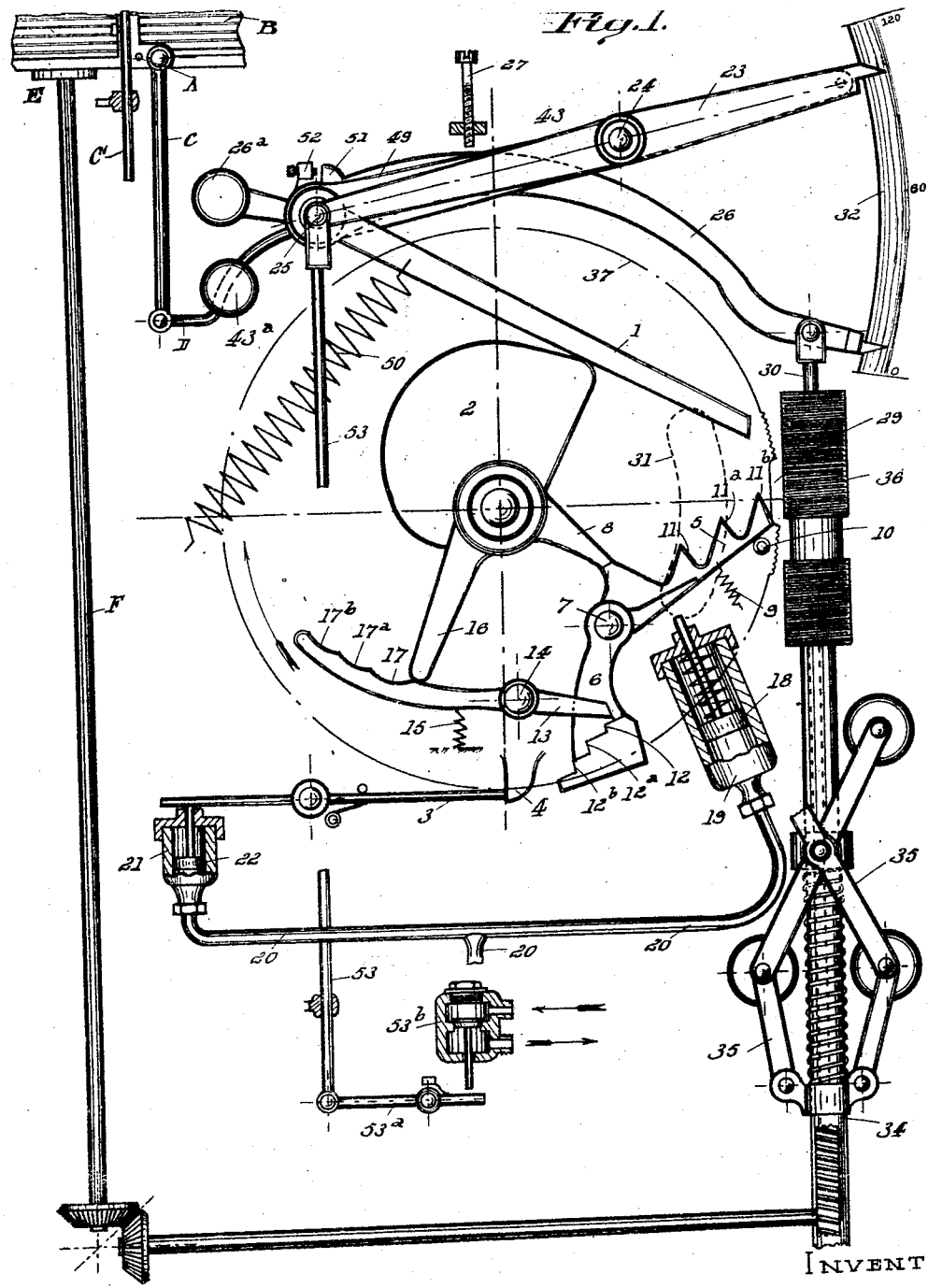
June 30, 1925. 1,544,483
E. RODOLAUSSE
SPEED CONTROLLING DEVICE FOR RAILWAY, TRAMWAY, AND SIMILAR TRAINS
Filed May 23, 1922. 3 Sheets-Sheet 1
INVENTOR
Eloi Rodolausse
ATTORNEY

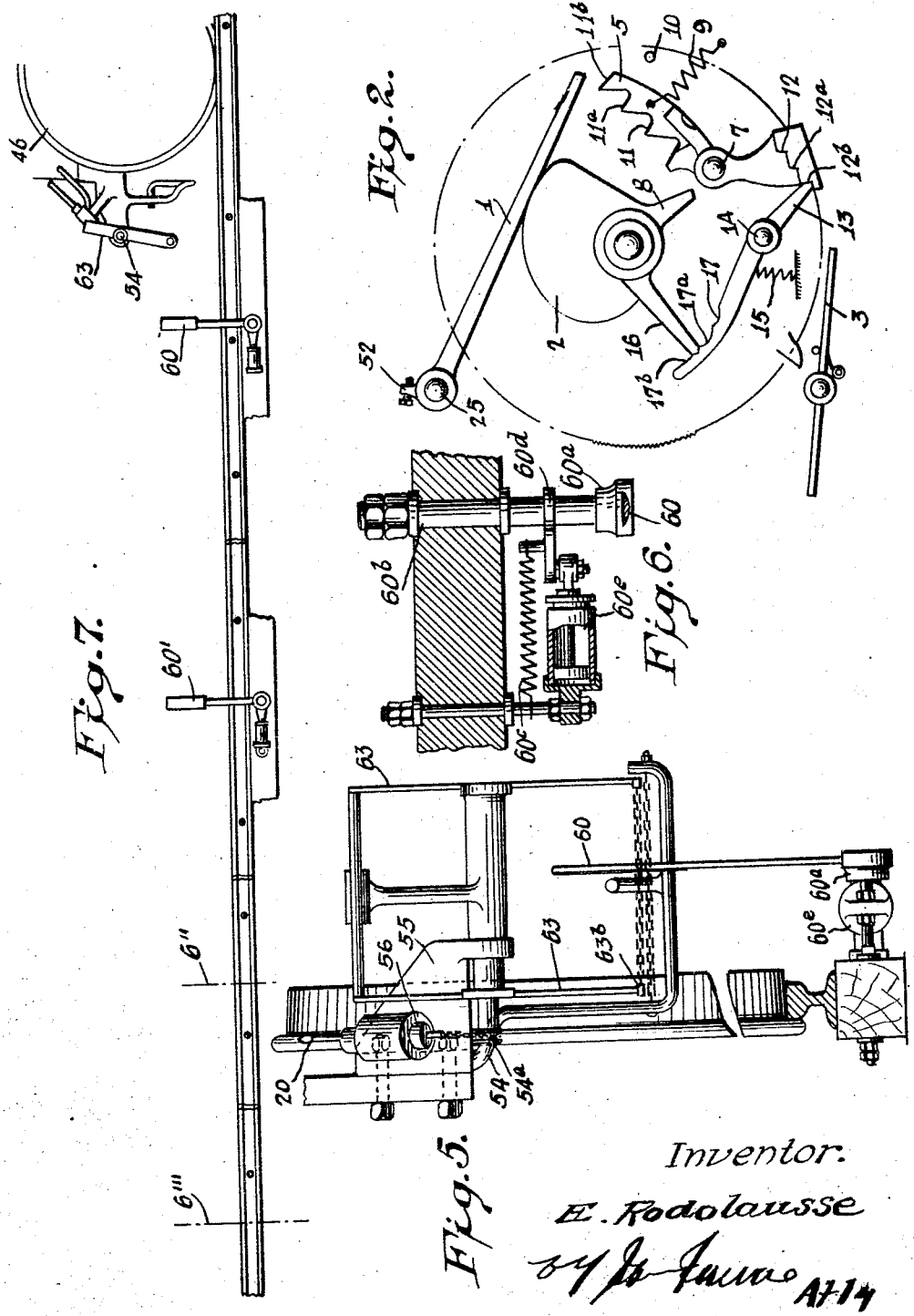

Patented June 30, 1925.

UNITED STATES PATENT OFFICE.

ELOI RODOLAUSSE, OF ST.-ANTONIN, FRANCE.

SPEED-CONTROLLING DEVICE FOR RAILWAY, TRAMWAY, AND SIMILAR TRAINS.

Application filed May 23, 1922. Serial No. 563,149.

*To all whom it may concern:*

Be it known that I, ELOI RODOLAUSSE, a citizen of the French Republic, and resident of St.-Antonin (Tarn and Garonne), France, have invented certain new and useful Improvements in Speed-Controlling Devices for Railway, Tramway, and Similar Trains, of which the following is a specification.

In the specification annexed to my patent application Serial No. 466,432 filed May 3d, 1921, I have described an apparatus serving to supervise and control the prescribed stoppings and decreases of speed of railway trains, and automatically apply the brakes should the speed of the train exceed the maximum speed or if the prescribed stoppings and decreases of speed are not dealt with according to instructions, said stoppings and decreases of speed being indicated to the driver by a supervision pointer operating in front of a second or speed pointer, the operations of which are a function of the speed of the train.

In said apparatus, disposed within a case mounted on the locomotive or tender, a supervision pointer is pivoted on a fixed pin carried at the end of a lever or support freely mounted on a fixed shaft. The position of said lever, which is balanced by a counterweight, may be regulated by means of a regulating screw in such a manner that the index of the pointer indicates on a graduated sector the maximum speed prescribed.

A second pointer, which I call a speed pointer, conveniently balanced by a counterweight, freely pivots on the said fixed shaft on which pivots the above mentioned lever or support of the supervision pointer. The speed pointer indicates at any instant the speed of the train and with this object in view, is connected to a wheel axle by any convenient transmission. The index of the speed pointer is conveniently bent, so as to move in the vertical plane of motion of the supervision pointer along a graduated sector.

The speed pointer as aforesaid, indicates always the speed of the train in kilometers per hour. When the speed of the train increases, the index of the said pointer moves towards the index of the supervision pointer. The index of the speed pointer strikes that of the supervision pointer when the speed of the train is equal to the maximum prescribed speed indicated by the supervision pointer. Now when the speed of the train exceeds the maximum speed prescribed and indicated by the supervision pointer, the speed pointer will push upwards the supervision pointer, which will rotate on its pivot and, by its opposite end, connected to a rod, pushes the latter downwards, whereby the rod, by the intermediate of a lever, opens the compressed air valve of the brakes and the latter are applied automatically, whereby the speed of train decreases.

Said supervision pointer may also be operated without the intermediary of the speed pointer, when the train approaches a signal, "at stop" on the track or passes over a lug on the track. With this object in view a mechanism is made use of, comprising a helical wheel rotatably mounted on a fixed shaft and provided with a weight which tends to rotate the wheel round its shaft, whereas the wheel is maintained in position by a lever leaning against a projection fixed on the wheel. The toothed periphery of the helical wheel shows a notched portion in front of a worm mounted on a shaft operated by a wheel axle of the train simultaneously with a centrifugal governor. The above mentioned lever preventing the rotary motion of the helical wheel, is operated by an air bag or any convenient device which in turn is operated by a lug placed on the track at the place where a decrease of speed should occur, thus producing ar oscillation of the lever, whereby the latter is drawn out of the way of the projection on the wheel, which latter, under the action of its counterweight, begins its rotary motion, after which the toothed portion of the periphery meshes with the rotary worm and the wheel performs a full revolution round its shaft.

On said helical wheel is keyed a cam of convenient shape against which is applied, by a counterweight or a spring, a lever pivoted on the shaft on which pivots the speed pointer and operating, by an arm or a catch fixed on same, the supervision pointer which is carried with the lever downwards towards the division zero of the scale of speeds on the sector, causing the applying of the brakes and eventually the stopping of the train.

Now my present improvement has for its object to provide an additional device conjugated with the aforesaid one, whereby the following operations will be produced automatically:

First: the release of the supervising cam and the lowering of the lever driving the supervision pointer if the train approaches a signal on the track where a desired decrease of speed is prescribed, the desired decrease of speed being for instance to 60 or 45 or 30 kilometers an hour.

Second: the stopping of said lever in the position corresponding to the very required decrease (either 60, 45 or 30 kilometers) of speed, as soon as the train has moved through a given distance beyond the point, where the decrease of speed is prescribed, for the purpose of causing—just at the moment the decrease of speed must be effective—the automatic operation of the brakes and the prescribed decrease of speed,—should the driver himself not reduce in time the rate of speed.

Said device comprises in combination:

(a) Two rocking lugs of special construction, intended to be engaged by the train and arranged on the track, one in front of the point where the train is to decrease its rate of speed, the other at a given distance beyond said point, so as to cause automatically—at said points—a releasing device, carried by the engine to simultaneously operate two pistons arranged to produce: first, the release of the supervision cam and the starting thereof at the moment the train passes in front of a point where the decrease of speed is prescribed; second: the second piston actuating a particular member, intended to stop the lowering of the lever which drives the supervision pointer, at the moment the train passes in front of the second lug on the track.

(b) A member limiting the lowering of the lever which drives the supervision pointer, mounted so as to be adapted to swing about an axis in fixed position only after the supervision cam has been released by the action of the first piston, and having two arms, each provided with stop teeth or notches corresponding respectively to a given rate of speed and arranged so as to be brought, if said lever is caused to swing, the one in front of the lever which drives the supervision pointer, the other in front of a pawl, the varying amount of swinging movement being adjusted by the position of the supervision cam at the moment the two-armed lever is actuated by the second piston, in such a way that at this precise moment said pawl will be exactly opposite a given stop-tooth of the two-armed lever and thus throw said lever into such a position that there will be opposite the lever driving the supervision pointer, a stop-notch corresponding exactly to the decrease of speed prescribed to the train in front of a given point on the track, and at a given distance from the point where the supervision cam has been put into operation.

(c) Two fingers integral with the supervision cam and arranged the one in front of the two-armed lever, the other in front of the pawl, so as to normally prevent the swinging of said members, said fingers following the supervision cam in its revolution so as to disengage:

1, the two-armed lever and enable the same to swing under the action of its driving member, if the engine meets with the second lug on the track.

2, the pawl, which has a suitably shaped extension to enable it to receive a swinging movement of a given amount and variable according to the angular rotation effected by the cam and the finger arranged in front of the pawl, at the moment the second lug is engaged by the train, said pawl thus engaging a given stop-tooth of the two-armed lever and throwing the latter into such a position that one of its stop-notches will be brought opposite the driving lever of the supervision pointer, said stop-notch being therefore determined by the position of the supervision cam, at the time of the swinging of the two-armed lever and by the location of the second lug on the track, that is at a given distance from the first named lug on the track.

Both lugs on the track are each formed of a metal blade mounted so as to be adapted to swing on an axis at the moment the train passes and actuated by a spring arranged to move said blade to its vertical position, the action of the spring and the velocity of the return movement of said blade being checked by an air brake or the like.

In order to facilitate the understanding of my present improvements, I have illustrated the same in the accompanying drawings, wherein:

Fig. 1 is a fragmentary front elevation of the apparatus described in my application No. 466432, comprising the main members of my present improvement in inoperative positions.

Fig. 2 is a similar view showing said members in operation.

Fig. 3 is a side elevation corresponding to Fig. 2.

Fig. 4 is a lateral view of a rocking lug on the track and the release mechanism mounted at the front of the engine.

Fig. 5 is a front view corresponding to Fig. 4.

Fig. 6 is a top view partially in section, of the lug.

Fig. 7 shows the position on the track of the lug intended to first operate the releasing mechanism on the train and cause the decrease of speed and a second lug at such a distance from the first one that, when the train passes same, the mechanism is again operated so as to bring the index of the supervision pointer just to the division of the sector indicating the required decreased speed.

In Figs. 1 and 2, 23 designates the supervision pointer mounted on a fixed pin 24 on one end of a supporting lever 49 (duly balanced by a counterweight), freely oscillating at its opposite end on a shaft 25 and regulable by means of a pressure screw 27 in such a manner that the index of the pointer 23 shows on the sector 32 the maximum speed prescribed. Lever 49 is provided near its fulcrum 25 with a catch 51.

A second pointer, called the speed pointer, is conveniently cranked at its free end so that the latter oscillates in the same vertical plane as pointer 23, along sector 32. The said pointer 26 indicates at every instant on the sector 32 the speed of the running train, and with this object in view, it is pivoted to a rod 30 rigidly connected to the movable sleeve of a centrifugal governor 35. The axis of said governor is connected by a convenient transmission (not shown) to a wheel axle of the train.

It may be understood that, when the speed of the train increases, the pointer 26 moves upwards, (under the action of the rising sleeve of the governor), towards the pointer 23, which latter is kept by the pressure screw 27 on the maximum speed prescribed. If the driver does not follow the oscillations of the speed pointer, it may occur that the speed of the train attains the prescribed maximum speed. At that instant the pointer 26 strikes the supervision pointer 23. When the speed of the train further increases, the pointer 26 presses against pointer 23, which latter, by its opposite end, pushes downward a rod 53 operating a lever 53ª, which in turn operates the valve 53ᵇ of the compressed air conduit of the brakes.

By means of its supporting lever, the supervision pointer 23 may be automatically moved on the scale 32 to indicate low speeds, for instance to 60, 45, 30 or 0 kilometers, whereby, when striking the speed pointer, a slackening of the speed or eventually a stopping of the train occurs. Such automatic decrease of speed is obtained in such conditions by means of one or two lugs placed on the track and putting in motion, at the passage of the train over the lugs, a mechanism carried by the locomotive and operating the supervision cam.

Said mechanism comprises a helical wheel 37 mounted on a fixed shaft and under the action of a counterweight 31 which tends to rotate the wheel clockwise.

During the normal running of the train, said wheel 37 is maintained in a fixed position by means of a lug 4 pressing on the free end of a two arm lever 3.

The wheel 37 shows on its toothed periphery a notched portion 29 which in Fig. 1 is shown in front of a worm 36 fixed on the shaft of the centrifugal governor 35. When in such position lever 3 is operated by a mechanism ad hoc mounted on the locomotive and striking a lug on the track, the lever liberates the lug 4 of wheel 37 and the latter, under the action of counterweight 31, begins rotating clockwise until the teeth on its periphery mesh with worm 36, after which it performs a full revolution round its shaft.

On the wheel 37 is fixed a cam 2 of convenient shape upon which is applied, by spring 50, a lever 1 pivoted on shaft 25. Said lever is provided with a catch 52. When wheel 37 rotates, cam 2 is carried with it and lever 1 moves downwards in such a manner that its catch 52 operates catch 51 on the lever carrying the supervision pointer, which latter will move downwards along the graduated sector towards the zero of the scale, whereby the opposite end of pointer 23 pushes downwards rod 53 and operates lever 53ª raising the compressed air valve of the brake mechanism, the brakes thus becoming automatically applied.

All the above mentioned motions are registered automatically by means of the swinging lever or support 49 carrying an extension D to which is pivoted a rod C provided at its upper end with a writing point and guiding along a vertical bar C', whereby the oscillations of the pointer 23 are registered on a strip of paper B mounted on a rotary drum fixed on a vertical shaft F operated from a wheel axle of the train by any convenient transmission as shown in part in Fig. 1.

The novel devices, object of the present invention, and hereinafter described, are intended to stop the downward motion of lever 1 in a position corresponding exactly to a predetermined decrease of speed at a precise point of the track at a given distance from the point where the supervision cam has been disengaged and thus cause under the conditions indicated in my application No. 466432 the automatic applying of the brakes, should the driver not exactly reduce the speed to the rate of speed prescribed at this point of the track.

In the apparatus shown by way of example in the drawings, three different decreases of speed may be secured, for instance 60, 45 and 30 kilometers an hour.

The apparatus comprises a two-armed lever 5, 6 (Figs. 1 and 2), mounted so as to be adapted to swing on a fixed pivot 7 and held against any accidental movement in normal operation by a finger 8 responsive to the rotary movement of the cam 2 and keyed on the shaft of the latter.

The arm 5 normally drawn by a spring 9 against a stop-pin 10, has stop-notches such as 11, 11ª and 11ᵇ, intended to be brought opposite the end of the driving lever 1 of the supervision pointer and stop said lever, as hereinafter described, in one of the positions determined by each notch 11, 11ª and 11ᵇ, corresponding respectively to one of the three desired decreases of speed.

The arm 6 is likewise provided with stop-notches 12, 12ª and 12ᵇ arranged in steps so as to be adapted to be brought opposite the nose of a pawl 13 intended to lock the lever 5, 6 at a given point of the track and hold said lever in such a position that opposite the lever 1 there will be one of the notches 11, 11ª or 11ᵇ according to the required decrease of speed.

To this end said pawl is mounted so as to be adapted to swing about an axis in fixed position 14 and submitted to the action of a spring 15 which causes said pawl to automatically engage one of the steps 12, 12ª or 12ᵇ; the finger 16, against which it is applied and which is responsive to the rotary movement of the cam 2, will be—during the rotation of said cam—moved away from the extension of said pawl, which is also provided with notches 17, 17ª and 17ᵇ, intended to limit the swinging movement of said pawl according to the position of the finger 16 during its rotation in front of either notch 17, 17ª, 17ᵇ.

The driving member of the two-armed lever 5, 6 consists of a piston 18 operating within a cylinder 19 when a hereinafter described releasing device carried by the engine is automatically brought into action by the engine engaging a rocking lug 60 (Fig. 7) on the track, said releasing device more particularly shown in Figs. 4, 5, and 7, being connected by a conduit 20 to said cylinder 19 and the conduit 20 being also connected to a second cylinder 21, the piston 22 of which causes the lever 3 to swing and the cam 2 to be disengaged (Figs. 1 to 4).

According to my present improvements, one lug 60 (Fig. 7) is arranged on the track at the point where a decrease of speed is indicated or desired, and another similar lug is likewise arranged beyond said point at a distance determined by one of the three decreases of speed and indicated by 60′, 60″, 60‴ in the drawing (Fig. 7).

Thus it will be seen that at the moment the train passes over lug 60 (and one of the lugs 60′, 60″, 60‴) on the track, both pistons 18 and 22 will be actuated simultaneously by a device to be later described.

As the two-armed lever 5, 6 is locked by a stop 8 integral with the cam 2, said lever cannot be actuated by the piston 18 unless said stop 8 have been moved by the cam 2 to a sufficient extent.

Therefore the first action of the releasing device 63, hereinafter described, and resulting from the engine engaging the first lug 60 on the track has only for its effect to produce—at the moment the train passes over said lug—the swinging of the lever 3 and the automatic release of the cam 2 which will then move with it the stop 8 and finger 16, the latter being moved in front of the notches 17, 17ª, 17ᵇ on the extension of the pawl 13. Each of said notches corresponds to one of the positions 60′, 60″, 60‴ respectively on the track, said positions being determined by the prescribed decreases of speed.

If the engine has travelled through the distance between two said lugs, that is, lug 60 and one of the lugs 60′, 60″ or 60‴, the second lug will be engaged in turn by the releasing member carried by the engine, so that both pistons 18 and 22 will again be moved simultaneously within the corresponding cylinders through the intermediary of the releasing device 63.

The movement of the piston 22 causes another swinging of the lever 3, whilst the movement of the piston 18 causes the swinging on the axis 7 of the lever 5, 6 which at this time is no longer retained by the finger 8 and pushed against the action of the spring 9 towards the lever 1, which will be lowered by the rotating cam 2.

At the moment the second lug on the track is engaged by the train, the finger 16 rotating with the cam 2 will be brought—according to the distance travelled through—opposite the notch 17, 17ª or 17ᵇ in the pawl 13, so that as soon as the lever 5, 6 has been forced away by the piston 18, said pawl 13 will swing under the action of its spring 15 until the notch which is opposite the finger 16, will engage the latter.

This limitation of the swinging movement of the pawl 13 has for its object to enable the nose thereof to be brought opposite a given notch 12, 12ª or 12ᵇ on the arm 6 of the lever 5, 6, so that if the latter is moved back after the action of the piston 18 by the spring 9, the arm 5 will bring its notch 11, 11ª or 11ᵇ opposite the lever 1 according to the position of the pawl 13.

As each one of these notches corresponds to a given different rate of speed, say 30, 45 or 60 kilometers, it will be seen that according to the position of the finger 16 (during the swinging movements of lever 5, 6) in front of the notches 17, 17ª, 17ᵇ, said lever 5, 6, will automatically and correspondingly bring the 30, 45 or 60 kilometers notch opposite the lever 1 and said lever may thus be stopped on one hand at a given rate of speed, and on the other hand at a given point of the track beyond the signal prescribing the decrease of speed.

In fact, the cam 2 making its revolution during a determinate travel, it will be obvious that the various passages of the finger 16 opposite the notches 17, 17ª and 17ᵇ correspond to a determinate travel of the train, so that if the second lug is arranged on the track at a distance from the first lug corresponding to one of the said different positions of said finger 16, it will be possible to automatically obtain the limitation of the speed to 30, 45 or 60 kilometers according to the location of said second lug and the more or less great distance thereof from the first lug 60.

Now the releasing device on the locomotive for operating both pistons 18 and 22 and the lugs on the track against which strikes the said releasing device will be described with reference to Figs. 4, 5, 6 and 7 of the drawing.

In front of the locomotive is mounted a releasing device 63 comprising a resilient frame rotatable on a shaft 54 and at the lower part 63$^b$ of which is suspended a chain 63$^a$, tensioned by the resilient arms of the frame, which, when the train passes, strikes the lug 60 on the track and slightly pivots on shaft 54 bearing a grooved pulley 54$^a$ within which is fixed one end of a small chain 55 the opposite end of which is secured to the rod of a double cone valve 58 pressed in normal conditions against an aperture in the compressed air conduit 59 of the brakes, the rod is provided with a guide freely slidable within the chamber 56 and placed under the action of a helical spring 57 which normally maintains the valve 58 against the aperture of the compressed air duct of the brakes. A second duct 20 at the top of chamber 56, opens into the cylinder containing the pistons 18 and 22 respectively.

Obviously when chain 63$^a$ strikes the lug 60, the frame 63 pivots on its shaft and the lug is rotated forward. At the same time the small chain 55 is slightly rolled up in the groove of the pulley and tensioned, thus pulling the valve rod, together with the valve 58, against the action of spring 57, whereby the air of the compressed air duct 59 enters during a small time the chamber 56 and duct 20, thus raising simultaneously both pistons 18 and 22. The train having passed the lug 60 on the track, the resilient frame 63 assumes again its normal position, the small chain 55 is no more tensioned and the spring 57 pushes the valve 58 back in its closing position.

The rocking lugs, shown in Figs. 4, 5 and 6 are formed by way of example of a metal blade 60 carried by a sleeve 60$^a$ loosely mounted on a shaft 60$^b$ to rock about the same if said blade is engaged by the releasing device 53 on the locomotive. Said blade 60 is normally held in its vertical position by a coil spring 60$^c$ and the sleeve 60$^a$ carries a crank arm 60$^d$ pivotally connected to the rod of a piston 60$^e$ reciprocating within a cylinder serving as a dash pot to check the velocity of the return movement of the blade 60.

The constructive arrangements herein described have been merely disclosed by way of example, the forms, materials and like thereof may of course be varied without departing from the scope of my invention.

The movable finger 8 which locks the lever 5, 6 in its inoperative position, may for instance be omitted without interfering with the operation of the apparatus.

With respect to the lugs arranged on the track, they have been described merely by way of example and it is obvious that they may be replaced by pedals or the like and act electrically on the member serving to release the cam and two-armed lever.

Likewise instead of the arrangement formed by a releasing device mounted on the locomotive and comprising a chain slightly tensioned on a rotary frame and operated by the lugs on the track, use may be made of a stirrup resiliently mounted on the train and operated by a lug on the track, the double conical spring actuated valve being arranged in the compressed air duct.

Claims:

1. A speed controlling device for railway, tramway and the like trains, comprising a normally inactive maximum permissive speed indicating or supervision pointer, a second speed pointer, indicating the actual speed of the running train and swinging in the plane of oscillation of the first named pointer, means between said second pointer and a wheel axle of the train for operating said speed pointer from the wheel axle, a compressed air conduit for the brakes, a valve in said conduit, connecting means between the supervision pointer and said valve, whereby the meeting of the actual speed indicating pointer with the supervision pointer causes the latter to open the valve and apply the brakes, means on the track for operating the supervision pointer independently of the action of the actual speed indicating pointer when a decrease of speed is required at a point of the track, means operated by said means on the track for automatically reducing the speed of the train to a predetermined speed and means for registering the oscillations of said supervision pointer.

2. A speed controlling device for railway, tramway and the like trains comprising a normally inactive supervision pointer, a second pointer indicating the actual speed of the train and swinging in the plane of oscillation of the first named pointer, means for transmitting the motion of the running train to said second pointer, a rocking lug on the track at the place where a decrease of speed is prescribed and adapted to be engaged by the locomotive, a second rocking lug on the track at a distance from the first one determined by the desired decrease of speed to be imparted to the train, a pneumatic device at the front of the locomotive and in connection with the compressed air conduit of the brakes, a piston slidable within a cylinder and operated by the compressed air of said conduit when the train passes over either of the mentioned lugs on the track, a fixed shaft, a normally inactive weighted worm wheel rotatively mounted on said fixed shaft, a stop on said wheel, a rod on said piston and operating a rocking lever maintaining said lug for preventing the rotary motion of said wheel, a rotary shaft operated by a wheel axle of the train, a worm keyed on said rotary shaft and meshing with the worm wheel, a non-toothed portion on the periphery of said worm wheel in front of the worm when the wheel is in its inactive position, a cam keyed on said worm wheel, a spring actuated lever applied on the periphery of said cam and pivoted on the shaft of the actual speed indicating pointer, and a projection on said lever for engaging the supervision pointer and drawing it downwards for operating the brakes when the passage of the train over the lug on the track causes the releasing of the worm wheel.

3. In a speed controlling device of the character described, a device for stopping the downward motion of the said spring actuated lever operating the supervision pointer in one of the positions corresponding to one of the various decreases of speed, comprising a second cylinder, connected with the compressed air duct of the brakes, a piston within said cylinder and operated by the pneumatic device on the locomotive when the latter passes over the second lug on the track, placed at a distance from the first one determined by the desired decrease of speed, a rod on said piston, a fixed shaft, a spring operated two armed lever rocking on said shaft and operated by said piston rod, a finger integral with the cam and cooperating with the two armed lever for normally preventing the rocking of same, separate notches, each corresponding to a desired decrease of speed, provided on one arm of said rocking lever and adapted to be brought opposite the end of the supervision pointer operating lever applied on the cam, stop steps provided at the second arm of the rocking lever, a fixed shaft, a double armed spring actuated pawl rocking on said shaft for engaging the said stop steps of the second lever arm and locking the said lever on one of its positions according to the desired decrease of speed, a second finger integral with said cam, for normally preventing the rocking of said pawl, and engaging various notches provided on the opposite arm of said pawl, whereby the effect of the first named lug on the track is only to release the worm wheel together with the cam and lever, the passage of the train on the second lug causing the two armed lever, previously engaging the first named finger of the cam, to rock so as to bring the notches into the path of the end of the supervision pointer separating lever and stopping said pointer in its downward movement, whilst the stop steps of the said rocking lever engage the pawl, the second finger of said cam engaging the notches on the arm of said pawl, the engaged notch and step on the rocking lever and the engaged notch on the pawl, being determined by the position of the cam at the time when the lever is rocked and by the distance between the two lugs on the track.

4. In a speed controlling device of the character described, two rocking lugs on the track, comprising each a horizontal shaft, a sleeve loosely mounted on said shaft, a metal blade carried on said sleeve, a coiled spring for maintaining said blade in a vertical position, a crank arm on said sleeve, a dashpot, and a piston reciprocating in the dashpot to check the velocity of the return motion of the blade into its vertical position, said crank arm being pivotally connected to the piston rod.

5. In a speed controlling device of the character described, a pneumatic releasing device mounted on the front of the locomotive, said device comprising a shaft, a frame mounted on said shaft, a slackly tensioned chain across the lower part of said frame, a cylinder on said frame connected at its top with the compressed air duct of the brakes, a worm wheel, a stepped rocking lever on said worm wheel, a second duct connecting the upper part of said cylinder with the piston operating the release of the worm wheel and with the piston operating the stepped rocking lever, a conical valve closing the compressed air duct, an axially slidable spring operated rod on said valve, a grooved pulley on the frame shaft, and a small chain fixed by one of its ends to the pulley and by its opposite end to the free end of the valve rod, said chain being pulled and slightly wound upon the pulley groove when the frame strikes the lug on the track, whereby the valve rod is pulled against the action of its spring and the valve uncovers the compressed air duct, compressed air flows in the second duct, operating both said pistons.

Dated this 8th day of May, 1922.

ELOI RODOLAUSSE.